United States Patent
Ahn et al.

(10) Patent No.: US 11,563,804 B2
(45) Date of Patent: Jan. 24, 2023

(54) DETERMINING TRANSMISSION PATH BASED ON PRE-STORED QUALITY INFORMATION FROM CLIENT DEVICES

(71) Applicant: SAMSUNG SDS CO., LTD., Seoul (KR)

(72) Inventors: Ho Sung Ahn, Seoul (KR); Jae Gu Kim, Seoul (KR); Ji Won Jung, Seoul (KR); Young Kwang Kim, Seoul (KR); Sang Bum Kim, Seoul (KR); Hee Tae Yoon, Seoul (KR); Jun Ho Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/886,138

(22) Filed: May 28, 2020

(65) Prior Publication Data

US 2020/0382587 A1 Dec. 3, 2020

(30) Foreign Application Priority Data

May 28, 2019 (KR) ........................ 10-2019-0062472

(51) Int. Cl.
*H04L 67/1061* (2022.01)
*H04L 45/302* (2022.01)
*H04L 43/0894* (2022.01)
*H04L 43/0829* (2022.01)
*H04L 43/0852* (2022.01)

(52) U.S. Cl.
CPC ...... *H04L 67/1063* (2013.01); *H04L 43/0829* (2013.01); *H04L 43/0852* (2013.01); *H04L 43/0894* (2013.01); *H04L 45/302* (2013.01)

(58) Field of Classification Search
CPC ............ H04L 67/1063; H04L 43/0829; H04L 43/0852; H04L 43/0894; H04L 45/302
USPC ........................................... 709/231
See application file for complete search history.

(56) References Cited

U.S. PATENT DOCUMENTS

| 8,463,936 | B2 * | 6/2013 | Maze | G06F 16/1834 |
| | | | | 709/238 |
| 8,699,366 | B2 * | 4/2014 | Rodrig | H04L 41/147 |
| | | | | 370/252 |
| 9,980,253 | B2 * | 5/2018 | Tamura | H04W 72/0406 |
| 9,998,901 | B2 * | 6/2018 | Qi | H04W 8/005 |

(Continued)

FOREIGN PATENT DOCUMENTS

KR   10-2007-0048014 A   5/2007

*Primary Examiner* — David P Zarka
(74) *Attorney, Agent, or Firm* — The PL Law Group, PLLC

(57) ABSTRACT

A data transmission method according to an embodiment is performed by a computing device including one or more processors and a memory in which one or more programs to be executed by the one or more processors are stored. The data transmission method includes receiving, from connected client devices, peer-to-peer (P2P) network information of the client devices, extracting one or more of information on whether network access is successful and network quality information, which are matched with the P2P network information and pre-stored, and determining one of a first data transmission path and a second data transmission path as a data transmission path for the client devices based on one or more of the information on whether network access is successful and the network quality information.

10 Claims, 5 Drawing Sheets

(56) References Cited

U.S. PATENT DOCUMENTS

| | | | | |
|---|---|---|---|---|
| 10,715,762 B2* | 7/2020 | Lee | ................... | H04W 76/10 |
| 2009/0080336 A1* | 3/2009 | Zhang | ................... | H04L 43/00 |
| | | | | 370/248 |
| 2010/0131596 A1* | 5/2010 | Im | ................... | H04L 67/1091 |
| | | | | 709/204 |
| 2014/0134955 A1* | 5/2014 | Honda | ................... | G01S 5/02 |
| | | | | 455/67.11 |
| 2015/0281108 A1* | 10/2015 | Furtak | ................... | H04L 45/125 |
| | | | | 370/392 |
| 2015/0382274 A1* | 12/2015 | Logvinov | ................... | H04L 41/0833 |
| | | | | 370/311 |
| 2018/0302832 A1* | 10/2018 | Huang | ................... | H04W 36/00835 |
| 2022/0131936 A1* | 4/2022 | Ahn | ................... | H04L 45/22 |

* cited by examiner

DETERMINING TRANSMISSION PATH BASED ON PRE-STORED QUALITY INFORMATION FROM CLIENT DEVICES

CROSS-REFERENCE TO RELATED APPLICATION (S)

This application claims the benefit under 35 USC § 119(a) of Korean Patent Application No. 10-2019-0062472, filed on May 28, 2019, in the Korean Intellectual Property Office, the entire disclosure of which is incorporated herein by reference for all purposes.

BACKGROUND

1. Field

Disclosed embodiments are related to data transmission technology.

2. Description of Related Art

A video conferencing service makes it possible to share data in a similar manner to a physical conference by displaying images transmitted and received by a plurality of participants on a screen of each participant. In the existing video conferencing service, when multiple participants exist in the video conference, a peer-to-peer (P2P) connection is randomly attempted between the participants, and data is shared through a P2P network when the connection is successful. That is, data (such as video and audio) is shared through P2P connection regardless of a network quality between the participants, and thus a problem occurs in that the quality of video or audio deteriorates when the amount of data exceeds an available network bandwidth.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a data transmission method and an apparatus for performing the method, which can prevent deterioration in data quality during data transmission.

In an embodiment, there is provided a data transmission method, which is performed by a computing device comprising one or more processors and a memory in which one or more programs to be executed by the one or more processors are stored, including receiving, from connected client devices, peer-to-peer (P2P) network information of the client devices, extracting one or more of information on whether network access is successful and network quality information, which are matched with the P2P network information and pre-stored, and determining one of a first data transmission path and a second data transmission path as a data transmission path for the client devices based on one or more of the information on whether network access is successful and the network quality information.

The first data transmission path may be a path that transmits data from one client device to another client device via the computing device and the second data transmission path may be a path that transmits data from one client device to another client device through a P2P connection.

The determining of the data transmission path may include checking whether a network access success rate between each of the client devices is less than a preset reference value based on the information on whether network access is successful and determining the first data transmission path as the data transmission path for the corresponding client devices when the network access success rate between the corresponding client devices is less than the preset reference value.

The determining of the data transmission path may include checking whether a network access success rate between each of the client devices is greater than or equal to a preset reference value based on the information on whether network access is successful, extracting network quality information pre-stored for corresponding client devices when the network access success rate between the corresponding client devices is greater than or equal to the preset reference value, and determining one of the first data transmission path and the second data transmission path as the data transmission path for the corresponding client devices based on the extracted network quality information.

The determining of the data transmission path may include checking from the extracted network quality information whether a network quality by the first data transmission path between the corresponding client devices is superior to a network quality by the second data transmission path and determining the first data transmission path as the data transmission path for the corresponding client devices when the network quality by the first data transmission path is superior to the network quality by the second data transmission path.

The data transmission method may further include, when the network quality by the first data transmission path is not superior to the network quality by the second data transmission path, determining the second data transmission path as the data transmission path for the corresponding client devices, and transmitting P2P network information of a peer device to the corresponding client devices.

In another embodiment, there is provided a computing device including one or more processors, a memory, and one or more programs, wherein the one or more programs are configured to be stored in the memory and to be executed by the one or more processors and the one or more programs include instructions for receiving, from connected client devices, peer-to-peer (P2P) network information of the client devices, extracting one or more of information on whether network access is successful and network quality information, which are matched with the P2P network information and pre-stored, and determining one of a first data transmission path and a second data transmission path as a data transmission path for the client devices based on one or more of the information on whether network access is successful and the network quality information.

The first data transmission path may be a path that transmits data from one client device to another client device via the computing device and the second data transmission path may be a path that transmits data from one client device to another client device through a P2P connection.

The instruction for determining the data transmission path may include instructions for checking whether a network access success rate between each of the client devices is less than a preset reference value based on the information on whether network access is successful and determining the first data transmission path as the data transmission path for the corresponding client devices when the network access success rate between the corresponding client devices is less than the preset reference value.

The instruction for determining the data transmission path may include instructions for checking whether a network access success rate between each of the client devices is greater than or equal to a preset reference value based on the information on whether network access is successful, extracting network quality information pre-stored for corresponding client devices when the network access success rate between the corresponding client devices is greater than or equal to the preset reference value, and determining one of the first data transmission path and the second data transmission path as the data transmission path for the corresponding client devices based on the extracted network quality information.

The instruction for determining the data transmission path may include instructions for checking from the extracted network quality information whether a network quality by the first data transmission path between the corresponding client devices is superior to a network quality by the second data transmission path and determining the first data transmission path as the data transmission path for the corresponding client devices when the network quality by the first data transmission path is superior to the network quality by the second data transmission path.

The one or more programs may further include instructions for, when the network quality by the first data transmission path is not superior to the network quality by the second data transmission path, determining the second data transmission path as the data transmission path for the corresponding client devices, and transmitting P2P network information of a peer device to the corresponding client devices.

In still another embodiment, there is provided a computing device including one or more processors, a memory in which one or more programs to be executed by the one or more processors are stored, a network information manager configured to transmit a peer-to-peer (P2P) network information of the computing device and network quality information at the time of connection of the computing device to a management server, and a network monitor configured to generate network quality information by measuring a network quality at the time of connection of the computing device.

The P2P network information may include one or more of a user identification (ID) of the computing device, private IP and port information, public IP and port information, and network identification information and the network information manager may include a first network information manager configured to transmit the P2P network information of the computing device to the management server and a second network information manager configured to transmit the network quality information at the time of connection of the computing device to the management server.

The network monitor may include a first monitor configured to, when the computing device is connected to the management server, generate network quality information by measuring a quality of a network between the computing device and the management server and a second monitor configured to, when the computing device makes a P2P connection to another client device, generate network quality information by measuring a quality of a network between the computing device and the other client device.

The first network information manager may transmit information on whether network access for the P2P connection is successful to the management server when the computing device makes a P2P connection to another client device.

In still another embodiment, there is provided a data transmission method, which is performed by a computing device comprising one or more processors and a memory in which one or more programs to be executed by the one or more processors are stored, including acquiring peer-to-peer (P2P) network information of the computing device, transmitting the P2P network information of the computing device to a management server, generating network quality information by measuring a network quality at the time of connection of the computing device, and transmitting the network quality information to the management server.

The generating of the network quality information may include, when the computing device is connected to the management server, generating the network quality information by measuring a quality of a network between the computing device and the management server and, when the computing device makes a P2P connection to another client device, generating the network quality information by measuring a quality of a network between the computing device and the other client device.

The data transmission method may further include, when the computing device makes a P2P connection to another client device, transmitting information on whether network access for the P2P connection is successful to the management server.

Other features and aspects will be apparent from the following detailed description, the drawings, and the claims.

Figure 1:
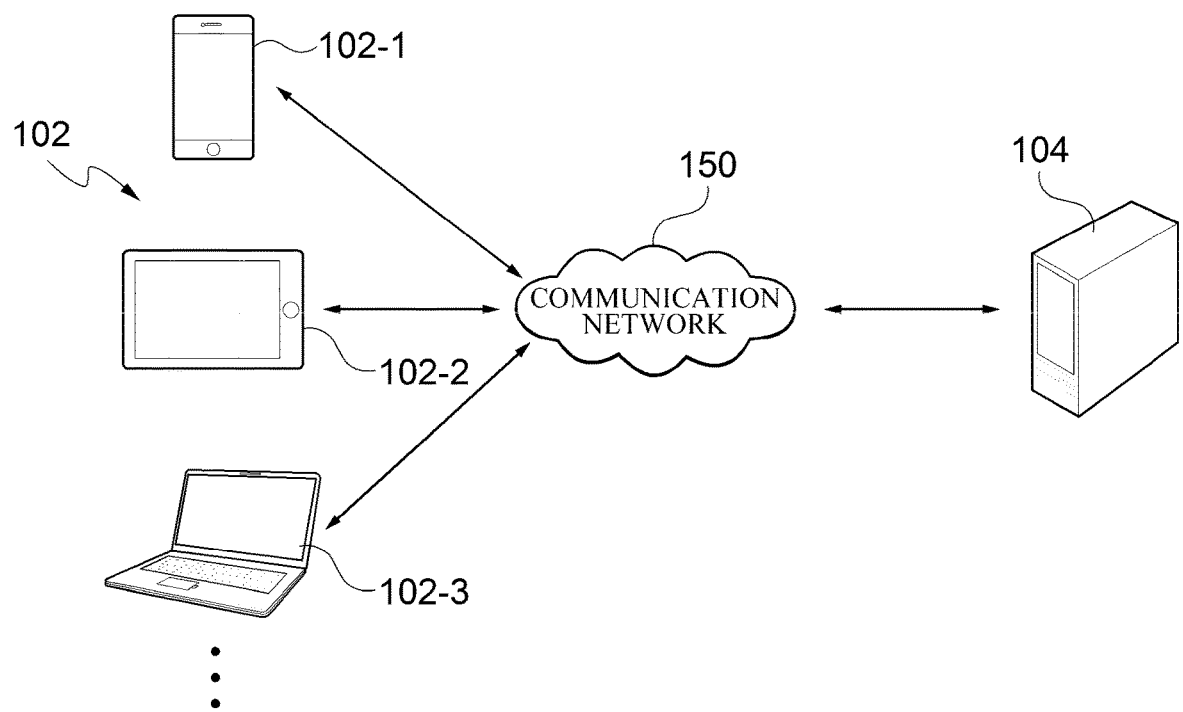
FIG. 1 is a diagram illustrating a configuration of a data transmission system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made based on the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

In the following description, the terminology of "communication", "transmission", "reception" of a signal or information and terminology similar thereto may include a meaning in which a signal or information is directly transmitted from one element to another element and is transmitted from one element to another element through an intervening element. Particularly, a meaning in which a signal or information is "transmitted" or "sent" to another element may indicate a final destination of the signal or information and may not mean a direct destination. This may be equally applied with respect to a meaning of "reception" of the signal or information. Further, in this specification, a meaning in which two or more pieces of data or information are related, it may mean that at least a portion of another data (or information) may be obtained based on one data when one data (or information) is obtained.

Further, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

FIG. 1 is a diagram illustrating a configuration of a data transmission system according to one embodiment of the present disclosure.

Referring to FIG. 1, the data transmission system 100 may include a client device 102 and a management server 104. The client device 102 is connected to communicate with the management server 104 through a communication network 150. In some embodiments, the communication network 150 may include the Internet, one or more local area networks, wide area networks, cellular networks, mobile networks, and other types of networks, or a combination of these networks.

Here, the data transmission system 100 will be described as a video conferencing service system, but the present disclosure is not limited thereto, and it is apparent that various other data transmission systems are applicable.

The client device 102 is a terminal of a user participating in a video conference. The client device 102 may be a terminal provided with equipment for a video conference, such as a camera, a microphone, and a display. A plurality of client devices 102 may be provided according to the number of users participating in the video conference. The client device 102 may include a communication device, such as a tablet personal computer (PC), a notebook computer, a desktop PC, a smartphone, or the like.

Figure 2:
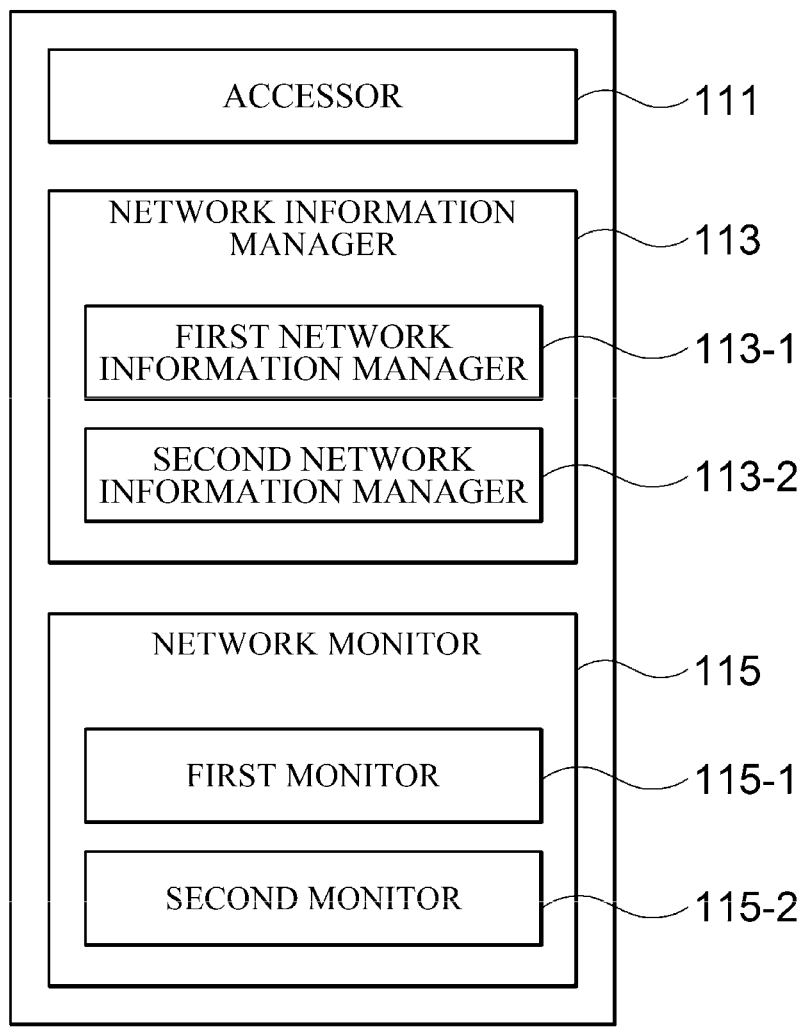
FIG. 2 is a block diagram illustrating a configuration of a client device according to one embodiment of the present disclosure.

FIG. 2 is a block diagram illustrating a configuration of the client device 102 according to one embodiment of the present disclosure. Referring to FIG. 2, the client device 102 may include an accessor 111, a network information manager 113, and a network monitor 115.

The accessor 111 may be connected to the management server 104 of the client device 102. In an exemplary embodiment, the accessor 111 may be connected to the management server 104 according to a user instruction of the client device 102. The accessor 111 may be connected to the management server 104 through preset authentication process.

The accessor 111 may make a P2P connection to another client device 102. The accessor 111 may receive P2P network information of another client device 102 from the management server 104 and make a P2P connection to the other client device 102 based on the received P2P network information.

The network information manager 113 may transmit the P2P network information of the client device 102 to the management server 104. In addition, when the client device 102 is connected to the management server 104 or another client device 102, the network information manager 113 may transmit quality information (i.e., network quality information) of a corresponding network to the management server 104.

The network information manager 113 may include a first network information manager 113-1 and a second network information manager 113-2. The first network information manager 113-1 may acquire P2P network information of the client device 102 and transmit the acquired P2P network information to the management server 104. Here, the P2P network information may include a user ID of the client device 102, private IP and port information, public IP and port information, network identification information (e.g., Wi-Fi service set identifier (SSID) and basic service set identifier (BSSID)) and the like.

Also, when the client device 102 makes a P2P connection to another client device 102, the first network information manager 113-1 may transmit network access success information to the management server 104. That is, each time the client device 102 makes a P2P connection, the first network information manager 113-1 may transmit information on whether network access is successful or failed (network access success information) to the management server 104.

When the client device 102 is connected to the management server 104, the second network information manager 113-2 may acquire network quality information on the quality of the network between the client device 102 and the management server 104 and transmit the acquired network quality information to the management server 104.

When the client device 102 is connected to another client device 102, the second network information manager 113-2 may acquire network quality information on the quality of the network between the client device 102 and the other client device 102 and transmit the acquired network quality information to the management server 104.

When the client device 102 is connected to the management server 104 or another client device 102, the network monitor 115 may monitor the quality of a corresponding network. The network monitor 115 may measure the network quality at the time of connection of the client device 102 and generate network quality information. Here, the network quality may include a usable bandwidth, network delay rate, network packet loss rate, and the like.

In an exemplary embodiment, the network monitor 115 may measure the network packet loss rate through the following method. When a data packet is transmitted to the management server 104 or another client device 102, the client device 102 may transmit the data packet by including a sequence number in the data packet. Then, the management server 104 or the other client device 102 may check loss rate of data packets based on the total number of data packets received for a predetermined period of time, the sequence number of the first data packet, and the sequence number of the last data packet.

For example, when the sequence number of the first data packet is 1, the sequence number of the last data packet is 100, and the number of received data packets is 50, it can be seen that the loss rate of data packets of a corresponding network (i.e., network packet loss rate) is 50%. In this case, the management server 104 or the other client device 102 may transmit the network packet loss rate to the client device 102.

In addition, the network monitor 115 may measure the network delay rate through the following method. The client device 102 may transmit a data packet including transmission time to the management server 104 or another client device 102 at regular time intervals. Then, the management server 104 or the other client device 102 may calculate the network latency using an arrival time of a data packet and the transmission time included in the data packet.

For example, if data packets transmitted from the client device 102 at 0 ms and 100 ms, respectively, arrive at 200 ms and 350 ms from the management server 104 or another client device 102, the network delay rate is 50 ms. In this case, the management server 104 or the other client device 102 may transmit the network delay rate to the client device 102.

The network monitor 115 may include a first monitor 115-1 and a second monitor 115-2. When the client device 102 is connected to the management server 104, the first monitor 115-1 may measure the quality of a network between the client device 102 and the management server 104. When the client device 102 is connected to another client device 102, the second monitor 115-2 may measure the quality of a network between the client device 102 and the other client device 102.

The management server 104 may be a server computing device for managing data transmission between the client devices 102. In an exemplary embodiment, the management server 104 may manage data transmission between the client devices 102 participating in a video conference during the video conference. Specifically, the management server 104 may receive P2P network information from each client device 102 connected to the management server 104 and store the received P2P network information.

Table 1 shows examples of P2P network information to be stored by the management server 104 according to one embodiment of the present disclosure. Table 1 shows user ID, private IP and port information, public IP and port information, network identification information (e.g., Wi-Fi SSID and BSSID), and the like as P2P network information.

TABLE 1

|  | User ID | Public IP & Port | Private IP & Port | Wi-Fi SSID | Wi-Fi BSSD | Zone |
|---|---|---|---|---|---|---|
| Terminal A | UserA | 1.1.1.1:1 | 192.168.0.2:9090 | UreadyA | 0a:0a:0a:0a:0a:0a | KR |
| Terminal B | UserB | 2.2.2.2:1 | 192.168.5.4:9090 | None | None | US |
| Terminal C | UserC | 1.1.1.1:1 | 192.168.0.8:9090 | UreadyA | 0a:0a:0a:0a:0a:0a | KR |

Table 2 shows examples of information on whether network access is successful which is stored by the management server 104 according to one embodiment of the present disclosure. When the management server 104 receives the information on whether network access at the time of P2P connection is successful from each client device 102, the management server 104 may count the number of successful accesses or unsuccessful accesses according to the success or failure of network access.

TABLE 2

| Src | Dst | The number of successful accesses | The number of unsuccessful accesses |
|---|---|---|---|
| Terminal A | Terminal B | 0 | 5 |
| Terminal A | Terminal C | 5 | 0 |
| Terminal B | Terminal A | 0 | 5 |
| Terminal B | Terminal C | 3 | 0 |
| Terminal C | Terminal A | 5 | 0 |
| Terminal C | Terminal B | 3 | 0 |

In addition, the management server 104 may receive network quality information from each client device 102 and store the received network quality information. The management server 104 may match and store P2P network information and network quality information for each client device 102. Table 3 shows examples of network quality information of each client device 102 stored by the management server 104 according to one embodiment of the present disclosure.

TABLE 3

| Src | Dst | Available Bandwidth | Avg. Loss rate | Avg. Delay rate | RTT |
|---|---|---|---|---|---|
| Terminal A | Terminal B | 4 Mbps | 2% | 100 ms | 200 ms |
| Terminal A | Terminal C | 20 Mbps | 0% | 5 ms | 10 ms |
| Terminal A | Server | 8 Mbps | 0% | 10 ms | 100 ms |
| Terminal B | Terminal A | 4 Mbps | 2% | 100 ms | 200 ms |
| Terminal B | Terminal C | 10 Mbps | 0% | 10 ms | 100 ms |
| Terminal B | Server | 8 Mbps | 0% | 10 ms | 100 ms |
| Terminal C | Terminal A | 20 Mbps | 0% | 5 ms | 10 ms |
| Terminal C | Terminal B | 10 Mbps | 0% | 10 ms | 100 ms |
| Terminal C | Server | 8 Mbps | 0% | 10 ms | 100 ms |

When each client device 102 accesses for a video conference, the management server 104 may set a data transmission path for each client device 102 based on pre-stored information on whether network access of each client device 102 is successful and pre-stored network quality information of each client device 102. In an exemplary embodiment, the data transmission path may include a first data transmission path that transmits data to another client device 102 via the management server 104 and a second data transmission path that transmits data through a P2P connection with another client device 102.

The management server 104 may determine whether the data transmission path of each client device 102 is the first data transmission path or the second data transmission path based on pre-stored information on whether network access of each client device 102 connected to the management server 104 is successful and pre-stored network quality information of each client device 102.

Specifically, the management server 104 checks the pre-stored information on whether network access of the client devices 102 connected to the management server 104 is successful, and if a network access success rate is less than a preset reference value, the management server 104 may determine that data transmission by the P2P connection is not attempted between the corresponding client devices 102.

The management server 104 may check pre-stored information on whether network access is successful or unsuccessful and, for client devices 102 whose network access success rate is greater than or equal to the preset reference value, the management server 104 may determine the first data transmission path or the second data transmission path based on pre-stored network quality information. In this case, the management server 104 may compare the network quality by the existing first data transmission path and the network quality by the exiting second data transmission path and determine the first data transmission path or the second data transmission path.

In the present disclosure, a module may mean a functional and structural combination of hardware for implementing the technical idea of the present invention and software for driving the hardware. For example, the "module" may mean a predetermined code and a logical unit of a hardware resource for executing the predetermined code, and does not necessarily mean a physically connected code or a one type of hardware.

According to the disclosed embodiment, by matching and storing P2P network information and network quality information for each client device 102, it is possible to determine which of the first data transmission path and the second data transmission path is preferable for the data transmission between the client devices 102, thereby preventing deterioration in quality during data transmission.

Figure 3:
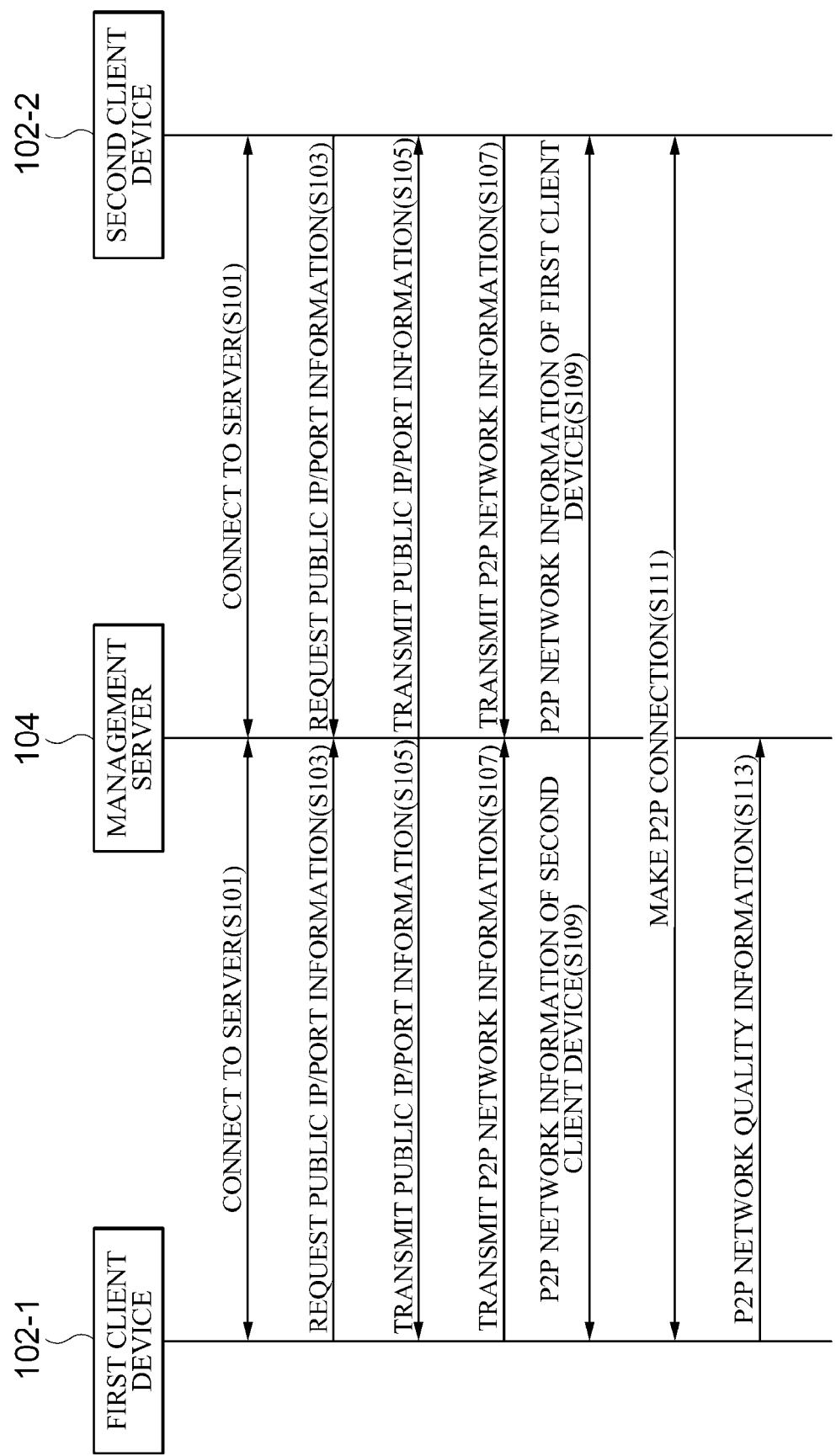
FIG. 3 is a flowchart illustrating a data transmission method according to one embodiment of the present disclosure.

FIG. 3 is a flowchart illustrating a data transmission method according to one embodiment of the present disclosure. Here, a process in which a first client device 102-1 and a second client device 102-2 transmit P2P network information and network quality information to a management server 104 is illustrated. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Referring to FIG. 3, the first client device 102-1 and the second client device 102-2 are connected to the management server 104 (S101).

Then, the first client device 102-1 and the second client device 102-2 request the management server 104 for their public IP and port information (S103), and receive their Public IP and port information from the management server 104 (S105).

Then, the first client device 102-1 and the second client device 102-2 transmit P2P network information including user ID, private IP and port information, public IP and port information, and network identification information (e.g., Wi-Fi SSID and BSSID) to the management server 104 (S107).

Here, the first client device 102-1 and the second client device 102-2 may query their user ID, private IP and port information, and network identification information and include the information in the P2P network information.

Then, the management server 104 may transmit the P2P network information of the second client device 102-2 to the first client device 102-1 and transmit the P2P network information of the first client device 102-1 to the second client device 102-2 (S109).

Thereafter, the first client device 102-1 and the second client device 102-2 make a P2P connection using each other's P2P network information (S111).

Then, the first client device 102-1 and the second client device 102-2 measure network quality information at the time of the P2P connection and transmit the measured network quality information to the management server 104 (S113). Also, the first client device 102-1 may transmit information on whether network access at the time of P2P connection with the second client device 102-2 is successful to the management server 104.

Meanwhile, when being connected to the management server 104, the first client device 102-1 and the second client device 102-2 may measure network quality information at the time of connection to the management server 104 and transmit the measured network quality information to the management server 104. As such, the management server 104 may store the network quality information of each client device 102 at the time of P2P connection and the network quality information of each client device 102 at the time of connection to the management server 104.

Figure 4:
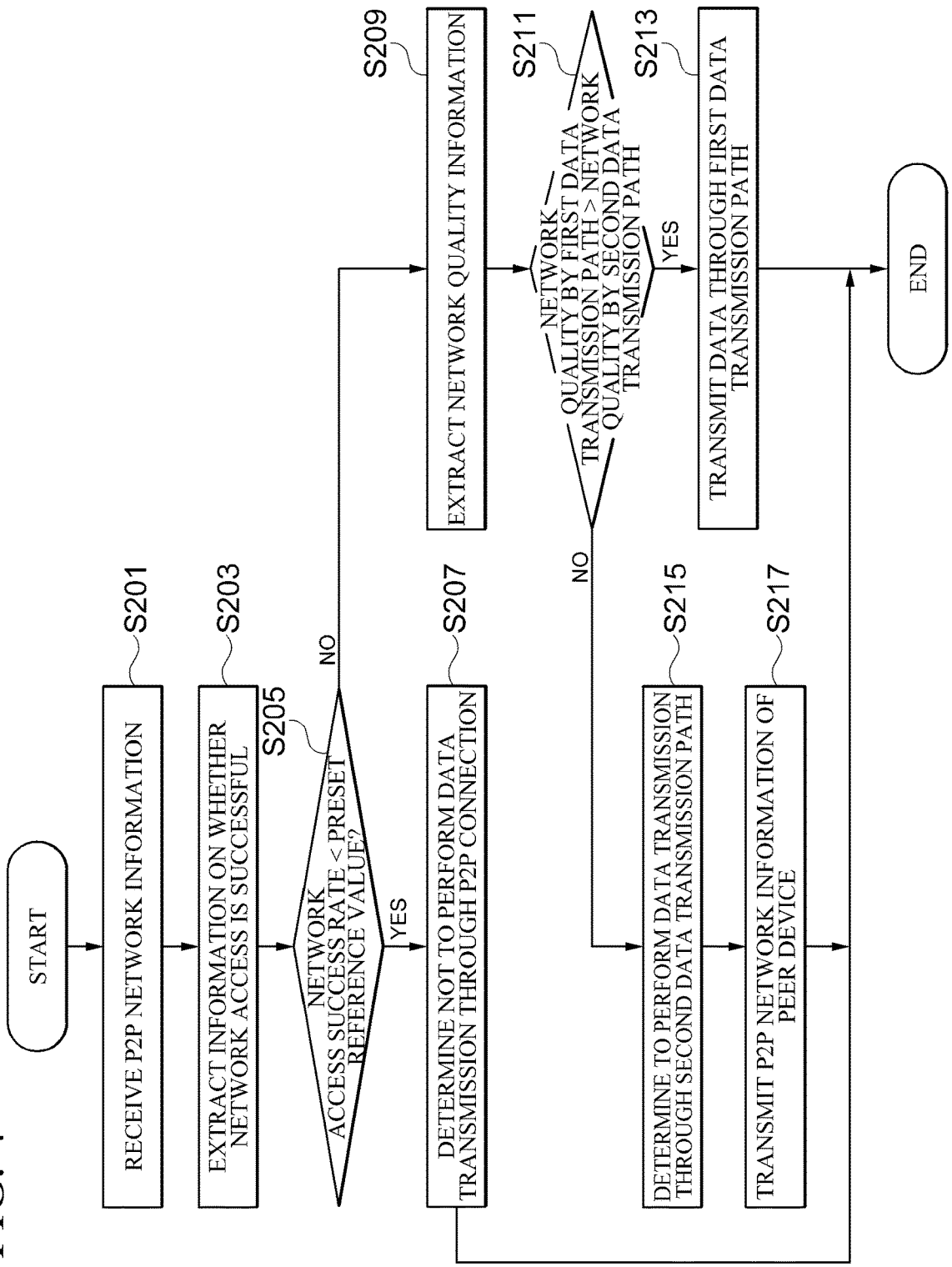
FIG. 4 is a flowchart illustrating a data transmission method according to another embodiment of the present disclosure.

FIG. 4 is a flowchart illustrating a data transmission method according to another embodiment of the present disclosure. Here, a process in which a management server 104 determines a data transmission path for each client device 102 is illustrated.

Referring to FIG. 4, the management server 104 receives P2P network information from client devices 102 connected to the management server 104 (S201).

Then, the management server 104 extracts information on whether network access of the client devices 102 connected to the management server 104 is successful based on P2P network information (S203).

Thereafter, the management server 104 checks whether network access success rate among each of the client devices 102 is less than a predetermined reference value based on the extracted information on whether network access is successful (S205).

When a result of checking in operation S205 shows that the network access success rate is less than the preset reference value, the management server 104 determines that data transmission through the P2P connection is not performed between the client devices 102 (S207).

That is, it may be determined that a second data transmission path is not used between the client devices 102 whose network access success rate is less than or equal to the preset reference value. The management server 104 may transmit data through a first data transmission path (i.e., a data transmission path via the management server 104) to the client devices 102 whose network access success rate is less than or equal to the preset reference value.

When a result of checking in operation S205 shows that the network access success rate is greater than or equal to the preset reference value, the management server 104 extracts pre-stored network quality information for the corresponding client devices 102 (S209).

Then, the management server 104 checks whether the network quality by the first data transmission path between the client devices 102 is superior to the network quality by the second data transmission path, based on the extracted network quality information (S211).

When a result of checking in operation S211 shows that the network quality by the first data transmission path is superior to the network quality by the second data transmission path, the management server 104 may transmit data between the corresponding client devices 102 using the first data transmission path (S213).

For example, it is assumed that a first client device 102-1, a second client device 102-2, and a third client device 102-3 are connected to the management server 104 and the network access success rate among the first client device 102-1 to the third client device 102-3 is greater than or equal to a preset reference value.

In this case, when the network quality by the existing first data transmission path (i.e., a data transmission path via the management server 104) between the first client device 102-1 and the second client device 102-2 is superior to the network quality by the second data transmission path (i.e., a data transmission path by P2P connection), the management server 104 may transmit data using the first data transmission path between the first client device 102-1 and the second client device 102-2. In this case, the management server 104 does not transmit P2P network information of a peer device to the first client device 102-1 and the second client device 102-2.

When a result of checking in operation S211 shows that the network quality by the first data transmission path is not superior to the network quality by the second data transmission path, the management server 104 determines that data transmission between the corresponding client devices 102 is performed using the second data transmission path (S215).

For example, when the network quality by the existing second data transmission path (i.e., a data transmission path by P2P connection) between the first client device 102-1 and the third client device 102-3 is superior to the network quality by the first data transmission path (i.e., a data transmission path via the management server 104), the management server 104 may determine that data transmission between the first client device 102-1 and the third client device 102-3 is performed using the second data transmission path.

Then, the management server 104 transmits P2P network information to the corresponding client devices 102 (S 217). In the previous example, the management server 104 may transmit the P2P network information of the third client device 102-3 to the first client device 102-1 and transmit the P2P network information of the first client device 102-1 to the third client device 102-3, thereby enabling a P2P connection between the first client device 102-1 and the third client device 102-3.

Figure 5:
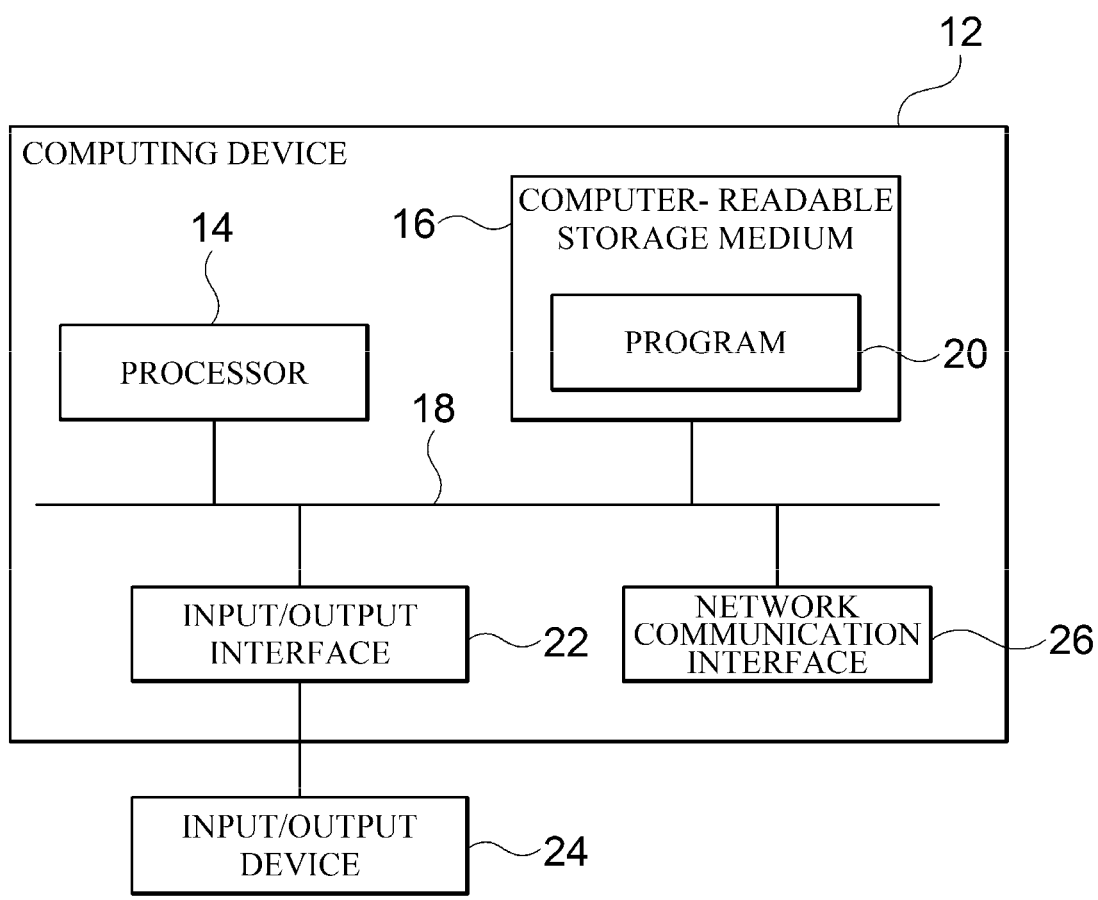
FIG. 5 is a block diagram for describing an example of a computing environment including a computing device suitable for use in exemplary embodiments.

FIG. 5 is a block diagram for describing an example of a computing environment 10 including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be a client device 102. In addition, the computing device 12 may be a management server 104.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiment, by matching and storing P2P network information and network quality information for each client device, it is possible to determine which of the first data transmission path and the second data transmission path is preferable to transmit data between the client devices, thereby preventing deterioration in quality during data transmission.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A non-transitory computer-readable storage medium storing one or more programs for execution by one or more processors of a computing device, the one or more programs comprising instructions for:
  receiving, from connected client devices, peer-to-peer (P2P) network information of the client devices;

extracting whether network access is successful and network quality information, which are matched with the P2P network information and pre-stored; and determining one of a first data transmission path and a second data transmission path as a data transmission path for the client devices based on whether the network access is successful, wherein the instruction for determining the data transmission path comprises an instruction for checking whether a network access success rate between each of the client devices is greater than or equal to a preset reference value based on the information on whether network access is successful, extracting network quality information pre-stored for corresponding client devices when the network access success rate between the corresponding client devices is greater than or equal to the preset reference value, and determining one of the first data transmission path and the second data transmission path as the data transmission path for the corresponding client devices based on the extracted network quality information.

2. The non-transitory computer-readable storage medium of claim 1, wherein the first data transmission path is a path that transmits data from one client device to another client device via the computing device and the second data transmission path is a path that transmits data from one client device to another client device through a P2P connection.

3. The non-transitory computer-readable storage medium of claim 2, wherein the instruction for determining the data transmission path comprises instruction for checking whether a network access success rate between each of the client devices is less than a preset reference value based on the information on whether network access is successful and determining the first data transmission path as the data transmission path for corresponding client devices when the network access success rate between the corresponding client devices is less than the preset reference value.

4. The non-transitory computer-readable storage medium of claim 2, wherein the instruction for determining of the data transmission path comprises instruction for checking from the extracted network quality information whether a network quality by the first data transmission path between the corresponding client devices is superior to a network quality by the second data transmission path and determining the first data transmission path as the data transmission path for the corresponding client devices when the network quality by the first data transmission path is superior to the network quality by the second data transmission path.

5. The computer-readable storage medium of claim 4, wherein the one or more programs further comprise instructions for:

when the network quality by the first data transmission path is not superior to the network quality by the second data transmission path, determining the second data transmission path as the data transmission path for the corresponding client devices; and transmitting P2P network information of a peer device to the corresponding client devices.

6. A computing device comprising:
one or more processors;
a memory; and
one or more programs, wherein the one or more programs are configured to be stored in the memory and to be executed by the one or more processors and the one or more programs include instructions for receiving, from connected client devices, peer-to-peer (P2P) network information of the client devices, extracting whether network access is successful, which are matched with the P2P network information and pre-stored, and determining one of a first data transmission path and a second data transmission path as a data transmission path for the client devices based on whether the network access is successful, wherein the instruction for determining the data transmission path includes instructions for checking whether a network access success rate between each of the client devices is greater than or equal to a preset reference value based on the information on whether network access is successful, extracting network quality information pre-stored for corresponding client devices when the network access success rate between the corresponding client devices is greater than or equal to the preset reference value, and determining one of the first data transmission path and the second data transmission path as the data transmission path for the corresponding client devices based on the extracted network quality information.

7. The computing device of claim 6, wherein the first data transmission path is a path that transmits data from one client device to another client device via the computing device and the second data transmission path is a path that transmits data from one client device to another client device through a P2P connection.

8. The computing device of claim 7, wherein the instruction for determining the data transmission path includes instructions for checking whether a network access success rate between each of the client devices is less than a preset reference value based on the information on whether network access is successful and determining the first data transmission path as the data transmission path for the corresponding client devices when the network access success rate between the corresponding client devices is less than the preset reference value.

9. The computing device of claim 7, wherein the instruction for determining the data transmission path includes instructions for checking from the extracted network quality information whether a network quality by the first data transmission path between the corresponding client devices is superior to a network quality by the second data transmission path and determining the first data transmission path as the data transmission path for the corresponding client devices when the network quality by the first data transmission path is superior to the network quality by the second data transmission path.

10. The computing device of claim 9, wherein the one or more programs further include instructions for when the network quality by the first data transmission path is not superior to the network quality by the second data transmission path, determining the second data transmission path as the data transmission path for the corresponding client devices, and transmitting P2P network information of a peer device to the corresponding client devices.

* * * * *